No. 761,868. Patented June 7, 1904.

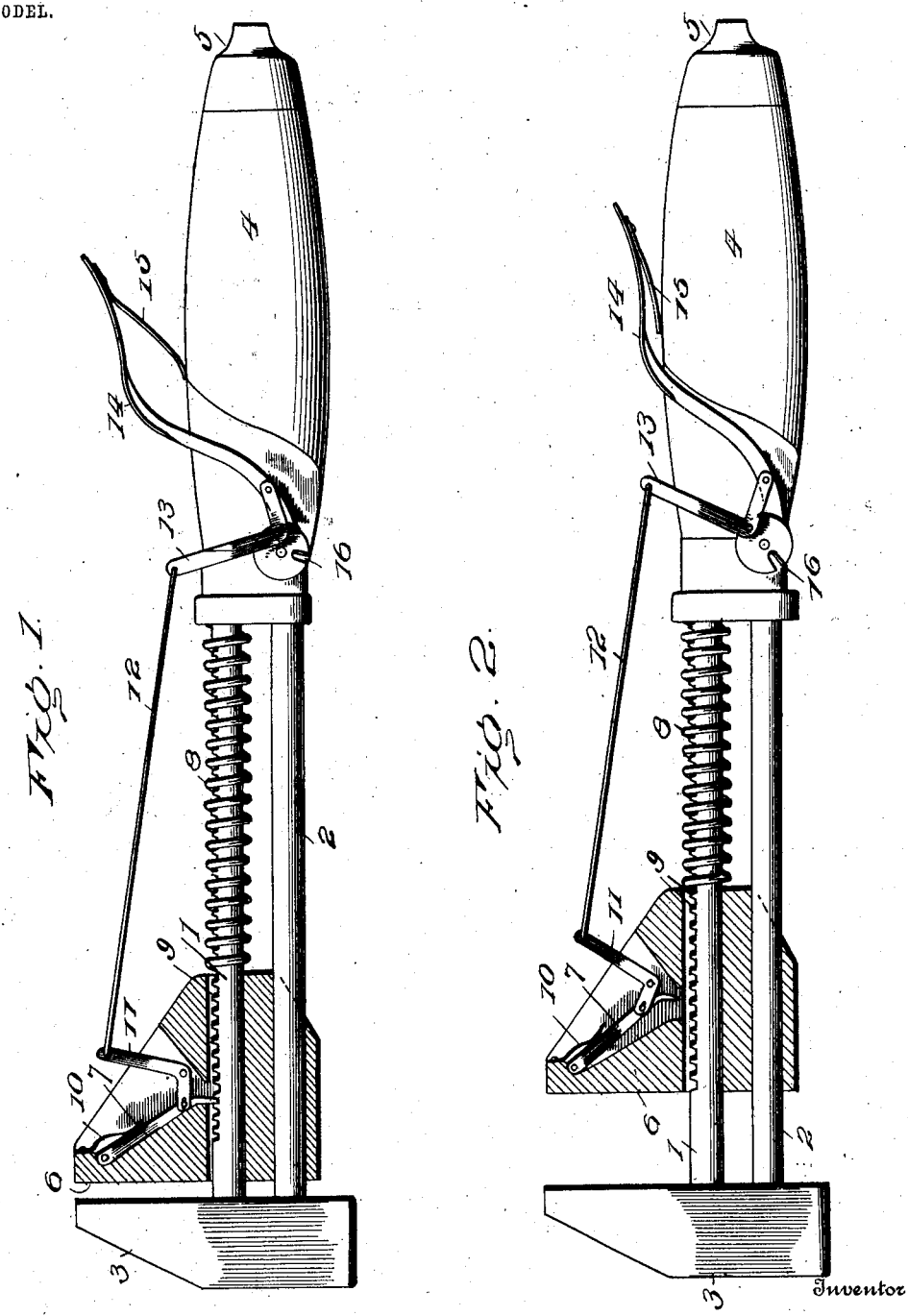

UNITED STATES PATENT OFFICE.

NORMAN E. ATKINSON, OF LITTLES, INDIANA, ASSIGNOR OF ONE-FOURTH TO JAMES M. STAFFORD, OF PETERSBURG, INDIANA.

WRENCH.

SPECIFICATION forming part of Letters Patent No. 761,868, dated June 7, 1904.

Application filed September 28, 1903. Serial No. 174,985. (No model.)

*To all whom it may concern:*

Be it known that I, NORMAN E. ATKINSON, a citizen of the United States, residing at Littles, in the county of Pike and State of Indiana, have invented certain new and useful Improvements in Wrenches, of which the following is a specification.

This invention has relation to the type of tools generally designated as "wrenches," and has for its object to combine with the movable jaw actuating and lock means whereby the user may operate and properly adjust the movable jaw with a single hand, the other hand remaining free to hold the work, to steady the operator in close places, or for any other purpose rendering it desirable to have one hand disengaged.

In its organization the tool is provided with a spring normally exerting a pressure upon the movable jaw to hold the same closed, a dog for securing the movable jaw at an adjusted position, and a lever connected with said jaw in such a manner as to release the movable jaw and move the same against the tension of the closing-spring, the parts being combined and arranged for operation substantially in the manner hereinafter set forth, claimed, and illustrated in the drawings hereto attached, in which—

Figure 1 is a side view of a wrench embodying the invention, the movable jaw being in central longitudinal section. Fig. 2 is a view similar to Fig. 1, showing the movable jaw spaced from the fixed jaw.

Corresponding and like parts are referred to in the following description and indicated in both views of the drawings by the same reference characters.

The stock or shank of the wrench may be of any construction and, as illustrated, comprises parallel members 1 and 2. The fixed jaw 3 is provided at one end of the shank and the handle 4 at the opposite end, which end terminates in a screw-driver 5. The movable jaw 6 is slidably mounted upon the stock or shank and is provided with means for reception of the members thereof and is recessed for reception of the dog 7 and parts cooperating therewith. The spring 8 for normally closing the jaw 6 is of the expansible type and is mounted upon the member 1. The dog 7 is pivoted at one end to the movable jaw 6, and its opposite end is adapted to cooperate with a series of teeth 9, provided along one side of the member 1, so as to hold the jaw 6 at the required position. A spring 10 is secured at one end to the jaw 6 and exerts a pressure upon the dog 7 to hold it in engagement with the teeth 9. A lever 11 of the elbow type is pivoted to the jaw 6, and one arm is loosely connected to the dog 7, and its opposite arm is connected by the wire 12 or analogous device to the arm 13, projected from the inner end of the operating-lever 14, pivoted to the handle 4 or other convenient portion of the wrench. A spring 15 normally presses the rear end of the lever 14 outward away from the handle 4, substantially as shown in Fig. 1. The arm 13 may form a part of an elbow-lever firmly attached to the pivoted end portion of the operating-lever 14 and is of a length proportionate to the movement of the operating-lever to insure a sliding movement of the jaw 6 upon the shank to the utmost capacity of the tool. The pivotal end of the operating-lever 14 is approximately of circular form and is provided in one edge with a notch 16, constituting a wire-cutter.

Under normal conditions the spring 10 holds the dog 7 in engagement with one of the teeth 9 of the shank and locks the jaw 6 against movement in either direction. Upon pressing the outer end of the lever 14 toward the handle 4 the dog 7 is disengaged from the teeth 9 and the jaw 6 liberated, and a continued pressure upon the lever 14 moves the jaw 6 upon the shank away from the fixed jaw 3 against the tension of the spring 8, which is compressed, thereby permitting adjustment of the wrench to the work which is received between the jaws 3 and 6. After the wrench has been fitted to the work the lever 14 is released and the spring 10, coming into play, forces the dog 7 into engagement with the proper tooth of the series of teeth 9 and secures the jaw 6 in the located position. The jaw 6 may be closed by pressing upon the lever 14 to release the dog 7, when a gradual relaxation of the grip upon the lever will permit the spring 8 to expand and close the jaw 6 against the jaw 3, as will be readily understood.

Having thus described the invention, what is claimed as new is—

1. In a wrench, the combination of the shank provided with a fixed jaw, a movable jaw slidable upon the said shank, a spring normally exerting a pressure on the movable jaw to close the same, locking means for securing the movable jaw in an adjusted position, the same comprising a dog and coöperating teeth, an operating-lever pivotally connected to the body of the wrench, and connecting means between said operating-lever and the said dog to effect a release of the movable jaw and to control the opening and the closing thereof, substantially as described.

2. In combination, a shank provided with a fixed jaw, a companion jaw slidable upon said shank, a spring normally exerting a pressure upon the movable jaw to hold it closed, locking means for securing the movable jaw in an adjusted position, the same consisting of a dog and a series of teeth coöperating therewith, a spring for normally holding the dog in engagement with said teeth, a lever pivoted to the movable jaw and loosely connected with the said dog, an operating-lever pivoted to the body of the wrench, and a connection between the operating-lever and the said lever pivoted to the movable jaw for effecting a release of the dog and controlling the movement of the movable jaw, substantially as set forth.

In testimony whereof I affix my signature in presence of two witnesses.

NORMAN E. ATKINSON. [L. S.]

Witnesses:
  MARSHALL M. KIME,
  JAMES M. STAFFORD.